Sept. 23, 1947.     A. W. PLENSLER     2,427,875
STEP-BY-STEP ELECTRIC MOTOR
Filed Feb. 17, 1945
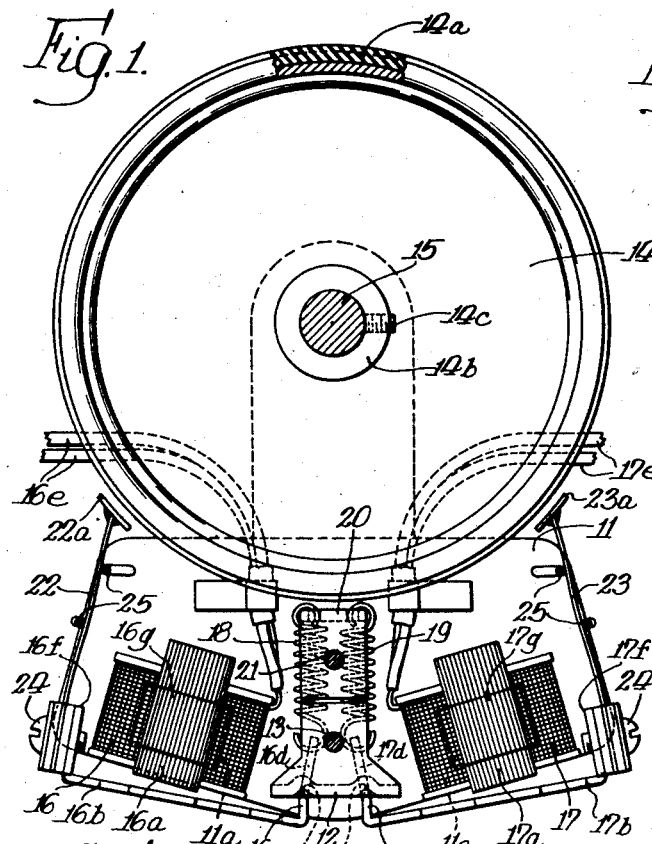
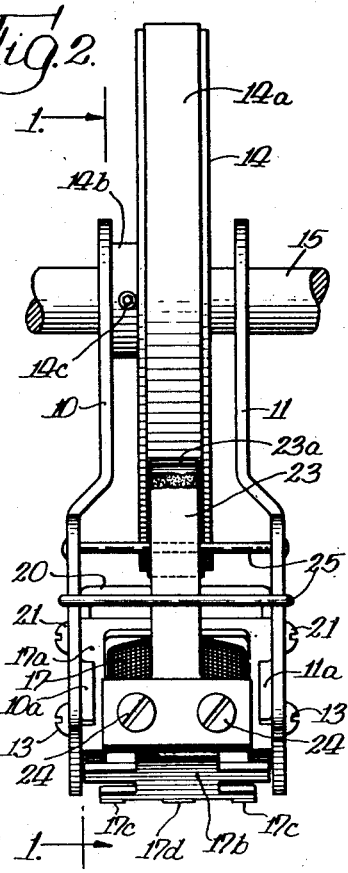
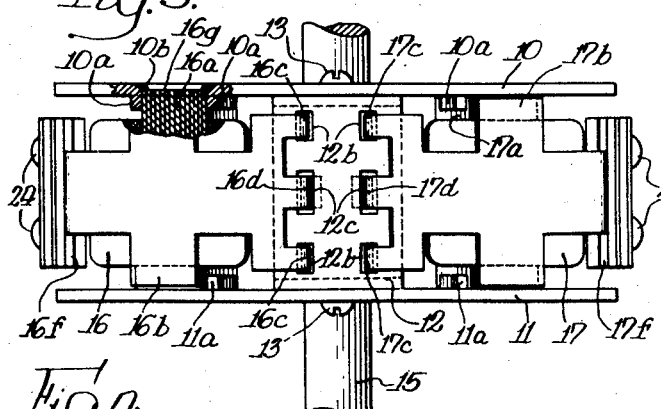
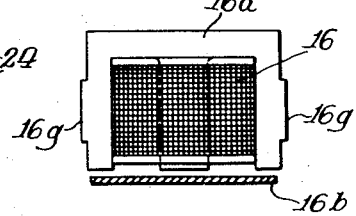
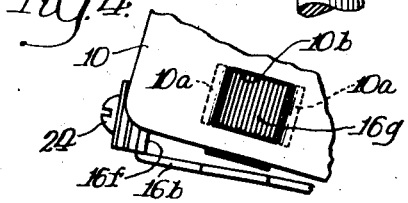
INVENTOR.
Alexander W. Plensler,
BY Mueller, Dodde & Mason
Atty's.

Patented Sept. 23, 1947

2,427,875

UNITED STATES PATENT OFFICE 2,427,875

STEP-BY-STEP ELECTRIC MOTOR

Alexander W. Plensler, Chicago, Ill., assignor, by mesne assignments, to Belmont Radio Corporation, Chicago, Ill., a corporation of Illinois Application February 17, 1945, Serial No. 578,458

7 Claims. (Cl. 172—126)

1

This invention relates to step-by-step electric motors and more particularly to such motors which are of the reversible type and which are exceptionally quiet in operation.

Heretofore there have been proposed numerous types of step-by-step electric motors suitable for low-power applications where low cost is an important factor, particularly for applications where relatively low speed and high torque are required. Motors of this type generally have involved one or more electromagnets having reciprocable armatures. In one type the armature is connected to the driving pulley through a resilient cord-like element resulting in quiet operation but relatively low torque and power output. In another type the driving pulley is connected with a serrated or toothed disk and the armature is connected to rotate the disk through a resilient spring arm. This type of motor provides a relatively high torque and power output but is relatively noisy.

Further, in applications where it is necessary to keep the cost of the motor to an absolute minimum, devices of the prior art have left something to be desired in the way of simplicity and low cost.

It is an object of the invention, therefore, to provide a new and improved step-by-step electric motor which is effective to overcome one or more of the disadvantages and limitations of the prior art motors of this type.

It is another object of the invention to provide a new and improved step-by-step electric motor which is exceptionally quiet in operation and which is effective to develop a relatively high torque and power output.

It is a further object of the invention to provide a new and improved step-by-step electric motor which is constructed of a minimum number of structural elements, which may be punchings or stampings.

In accordance with the invention, a step-by-step electric motor comprises a rotatable driven wheel having a resilient peripheral friction surface, electromagnetic means having a reciprocable armature and a driving arm connected to be actuated by the armature and having a driving shoe of substantial area in engagement with the friction surface of the wheel. In a preferred form of the motor, there are provided two electromagnets and associated armatures and the driving arms act on opposite sides of the axis of rotation of the driving wheel and are thus effective to drive the wheel in opposite directions.

2

Further in accordance with the invention, a step-by-step electric motor comprises a pair of identical stamped side plates, a stamped bracket interconnecting and relatively supporting the side plates, and a driven wheel rotatably supported by and between the side plates. The motor also includes electromagnetic coil means supported by and between the side plates, at least one stamped armature for the electromagnetic means pivotally supported from the bracket, and a driving arm connected to be actuated by the armature and having a driving engagement with the wheel.

For a better understanding of the invention, together with other and further objects thereof, reference is had to the following description taken in connection with the accompanying drawings, while its scope will be pointed out in the appended claims.

Referring now to the drawings, Fig. 1 is a view in front elevation, partly in section, of a step-by-step motor embodying the invention; Fig. 2 is an end view and Fig. 3 a bottom view of the motor of Fig. 1; while Figs. 4 and 5 show details of the electromagnetic coil means of the motor and its mounting in the motor frame.

Referring now to the drawing, there is illustrated a reversible step-by-step electric motor embodying the invention and requiring, as structural members thereof, only four different stampings, a drive wheel and shaft, and a pair of driving arms. This motor comprises a pair of identical stamped side plates 10 and 11 and a stamped U-shaped bracket 12 interconnecting and relatively supporting the side plates 10 and 11, its side arms being secured thereto by rivets or machine screws 13 or equivalent. The motor also includes a driven wheel 14 having a resilient peripheral friction surface portion 14a of rubber or other resilient material and a shaft 15 therefor rotatably supported by and between the side plates 10 and 11. Since the motor is inherently a low-speed motor, the shaft 15 may be disposed in aligned apertures in the plates 10 and 11 serving as bearings for the shaft. The wheel 14 is provided with a hub 14b which may be secured to the shaft 15 by one or more set screws 14c.

The motor also includes electromagnetic coil means, specifically a pair of electromagnets 16 and 17 comprising laminated shell-type cores 16a and 17a, respectively, the bottom arms of which are left open, as shown in Fig. 5. The cores 16a and 17a are supported directly by and between the side plates 10 and 11. For example, there are struck inwardly from the side plates 10 and 11 lugs or ears 10a, 10a and 11a, 11a which are disposed to grip the side arms of the magnetic core members 16a and 17a, respectively. The striking of these lugs from the side plates 10 and 11 leaves windows therein, such as the window 10b, and the cores are provided with extensions such as the extensions 16g which are proportioned to fit closely within the windows 10b to hold the electromagnets securely in place. If desired, the core extensions may be soldered to the edges of the windows in the side plates 10 and 11, as indicated by the soldering of the extension 16g to the window 10b in Fig. 4.

The electromagnets 16 and 17 are provided with a pair of identical stamped reciprocable armatures 16b, 17b, respectively, each being pivotally supported from the bracket 12 and operable upon energization of the electromagnets 16 and 17 to form with its respective core a substantially closed magnetic circuit therefor. To this end, the inner ends of the armatures 16b, 17b are formed with three upturned prongs, the outer two of which 16c, 17c terminate in knife-edges or equivalent pivotal members which are seated in V-shaped indentations 12b, stamped in the lower face of the bracket 12. The central prongs 16d, 17d of the armatures 16c, 17c, respectively, project upwardly through apertures 12c in the bracket 12 and are individually engaged by a pair of springs 18, 19 extending from a second stamped U-shaped bracket 20 interconnecting the side plates 10 and 11, the arms thereof being secured to the side plates by way of rivets or screws 21, 21, or equivalent. The springs 18 and 19 are disposed to bias the armatures 16b, 17b, respectively, away from their respective electromagnets and to act in lines very near the pivotal axes of their respective armatures so that the armatures 16b, 17b are very sensitive to even slight energization of their respective electromagnets. Suitable connections 16e, 17e are made to the windings of the electromagnets 16 and 17, respectively.

The motor also includes a pair of driving arms 22, 23, preferably formed of leaf-spring material, individually connected to be actuated by the armatures 16b, 17b. Specifically, the outer ends of the armatures 16b, 17b are upturned as at 16f, 17f, respectively, and the arms 22 and 23 are secured thereto by rivets or screws 24, or the like. The driving arms 22, 23 have driving shoes 22a and 23a, respectively, of substantial area secured to their upper ends by soldering or otherwise and disposed in engagement with the friction surface 14a of the wheel 14, the arms 22 and 23 acting on the wheel 14 on opposite sides of its axis of rotation and therefore being effective when reciprocated to rotate the wheel 14 in opposite directions. If desired, guide rods 25 may extend between the side plates 10 and 11 and be soldered or otherwise suitably connected thereto to prevent buckling of the resilient driving arms 22 and 23 during operation of the motor.

It is believed that the operation of the motor of the invention will be apparent from the foregoing description. In brief, energization of one of the electromagnets, for example electromagnet 16, by an alternating current, such as a commercial 60-cycle alternating current, is effective to reciprocate its armature 16b against the bias of its spring 18, thereby reciprocating the driving arm 22. The shoe 22a engages the resilient portion 14a of the wheel 14 and gives it a force having a substantial tangential component which produces a step-by-step rotation of the wheel 14 in a clockwise direction, as viewed in Fig. 1. In practice, the armature 16b does not return fully to its deenergized position shown in the drawings during each alternation of the exciting current but partakes of a low-amplitude 120-cycle oscillation in apparent continuous contact with the resilient frictional surface 14a of wheel 14, producing nearly continuous rotation thereof. Similarly, excitation of the electromagnet 17 produces rotation of the motor in the opposite direction.

The several features described cooperate to produce a reversible step-by-step motor of extreme simplicity and low cost and yet one developing a substantial power output at low speeds. As seen, the motor requires as structural members only four different stampings: (1) the identical side plates 10 and 11, (2) the bracket 12, (3) the bracket 20 and (4) the identical armatures 16b, 17b. In addition to these four structural elements, the motor comprises only the drive wheel and its shaft, the pair of driving arms 22 and 23, the electromagnets 16 and 17 and miscellaneous elements such as the biasing springs 18, 19, screws, wires, etc. Therefore, the motor can be constructed in a minimum of assembly operations and from a minimum number of parts, at extremely low cost. At the same time, the knife-edge support of the reciprocable armatures 16b, 17b, the disposition of their biasing springs 18 and 19, respectively, and the substantially closed magnetic circuit of the electromagnets 16 and 17 when energized impart to the motor a relatively high efficiency enabling it to develop a substantial power output at low speed. At the same time, the use of the driving wheel with the friction surface 14a and the cooperating driving shoes 22a, 23a reduces to a minimum the operational noise which is generally associated with this type of step-by-step motor, so that the motor is extremely quiet in operation.

While there has been described what is at present considered to be the preferred embodiment of the invention, it will be apparent to those skilled in the art that various changes and modifications may be made therein without departing from the spirit or scope of the invention.

What is claimed as new is:

1. A step-by-step electric motor comprising, a rotatable driven wheel having a resilient peripheral friction surface, electromagnetic means having a magnetic core and a reciprocable armature operable to form with said core a substantially closed magnetic circuit, and a driving arm connected to be actuated by said armature and having a driving shoe of substantial area in continuous engagement with said friction surface of said wheel during normal operation of the motor.

2. A reversible step-by-step electric motor comprising, a rotatable driven wheel having a resilient peripheral friction surface, electromagnetic means having a pair of magnetic cores and reciprocable armatures therefor operable to form with said cores substantially closed magnetic circuits, and a pair of driving arms individually connected to be actuated by said armatures, each of said arms having a driving shoe of substantial area in continuous engagement with said friction surface of said wheel during normal operation of the motor, said arms having lines of action on said wheel on opposite sides of its axis of rotation.

3. A step-by-step electric motor comprising, a rotatable driven wheel having a resilient peripheral friction surface, electromagnetic means having a magnetic core and a pivoted reciprocable armature operable to form with said core a substantially closed magnetic circuit, means for biasing said armature away from said means and disposed to act in a line near the pivotal axis of said armature, and a driving arm connected to be actuated by said armature and having a driving shoe of substantial area in continuous engagement with said friction surface of said wheel during normal operation of the motor.

4. A step-by-step electric motor comprising, a rotatable driven wheel having a resilient peripheral friction surface, electromagnetic means having a magnetic core and a reciprocable armature operable to form with said core a substantially closed magnetic circuit, and a leaf-spring driving arm connected to be actuated by said armature and having a driving shoe of substantial area in continuous engagement with said friction surface of said wheel during normal operation of the motor.

5. A step-by-step electric motor comprising, a pair of identical stamped side plates, a stamped bracket interconnecting and relatively supporting said side plates, a driven wheel rotatably supported by and between said side plates, electromagnetic coil means supported by and between said side plates, at least one stamped armature for said means pivotally supported from said bracket, and a driving arm connected to be actuated by said armature and having a driving engagement with said wheel.

6. A step-by-step electric motor requiring as structural members only four different stampings, a drive wheel and shaft, and one or more driving arms comprising, a pair of identical stamped side plates, a first stamped bracket interconnecting and relatively supporting said side plates, a driven wheel and a shaft therefor rotatably supported by and between said side plates, electromagnetic coil means supported by and between said side plates, at least one stamped armature for said means pivotally supported from said bracket, a second stamped bracket interconnecting said side plates, a biasing spring extending from said second bracket to said armature, and a driving arm connected to be actuated by said armature and having a driving engagement with said wheel.

7. A reversible step-by-step electric motor comprising, a pair of identical stamped side plates, a stamped bracket interconnecting and relatively supporting said side plates, a driven wheel rotatably supported by and between said side plates, a pair of electromagnets supported by and between said side plates, a pair of identical stamped armatures for said electromagnets pivotally supported from said bracket, and a pair of driving arms individually connected to be actuated by said armatures, each of said arms having a driving engagement with said wheel, said arms being effective to rotate said wheel in opposite directions.

ALEXANDER W. PLENSLER.

REFERENCES CITED

The following references are of record in the file of this patent:

UNITED STATES PATENTS

| Number | Name | Date |
| --- | --- | --- |
| 1,890,800 | Williams | Dec. 13, 1932 |
| 1,968,973 | Thompson | Aug. 7, 1934 |
| 1,971,130 | Chubb | Aug. 21, 1934 |